United States Patent [19]
Scholten

[11] Patent Number: 5,998,954
[45] Date of Patent: *Dec. 7, 1999

[54] ELECTRICAL ACTUATOR WITH A REFINED CASCADE CONTROL UNIT

[75] Inventor: Lutz Scholten, Aachen, Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/691,779

[22] Filed: Aug. 2, 1996

[30] Foreign Application Priority Data

| Aug. 4, 1995 | [EP] | European Pat. Off. | 95202136 |
| May 28, 1996 | [EP] | European Pat. Off. | 96201451 |

[51] Int. Cl.⁶ .................................................. G05B 11/28
[52] U.S. Cl. .......................................... 318/599; 318/615
[58] Field of Search ..................................... 318/432, 433, 318/434, 599, 606–618

[56] References Cited

U.S. PATENT DOCUMENTS

| 4,276,499 | 6/1981 | Masuda et al. | 318/119 |
| 4,911,125 | 3/1990 | Sugawara et al. | 123/399 |
| 5,157,956 | 10/1992 | Isaji et al. | 73/1.75 |
| 5,333,584 | 8/1994 | Kamio et al. | 123/399 |
| 5,428,285 | 6/1995 | Koyama et al. | 318/799 |
| 5,429,087 | 7/1995 | Tsujino et al. | 123/336 |
| 5,463,298 | 10/1995 | Kamio et al. | 318/599 |
| 5,619,112 | 4/1997 | Younessi et al. | 318/689 |
| 5,623,906 | 4/1997 | Storhok | 123/419 |
| 5,640,943 | 6/1997 | Tasaka et al. | 123/399 |

FOREIGN PATENT DOCUMENTS

| 0242867A2 | 10/1987 | European Pat. Off. . |
| 0334613A2 | 9/1989 | European Pat. Off. . |
| 0604149A2 | 6/1994 | European Pat. Off. . |

OTHER PUBLICATIONS

Control of Electrical Drives: by W. Leonhard, ISBN 3–540–13650–9 Springer–Verlaag Berlin Heidelberg New York Tokyo, Chapter 15.2 entitled "Linear Position Control" 1990.

*Primary Examiner*—Brian Sircus
*Attorney, Agent, or Firm*—F. Brice Faller

[57] ABSTRACT

Electrical actuator having a stator body and a rotor body which is pivotable iN the stator body through an angle of rotation. The actuator further comprises energizing means for exerting an electromagnetic torque on the rotor body and a control unit for controlling the angle of rotation. The control unit has a cascade control structure with a first control member for converting an electrical input signal corresponding to a required angle of rotation into an electrical intermediate signal corresponding to a required electromagnetic torque to be exerted on the rotor body and with a second control member for converting the intermediate signal into an output signal corresponding to a required electrical current through the energizing means. The first and second control members allow for specific intermediate calculations of the required electromagnetic torque and the required current, whereby the response time and accuracy of the control unit are improved.

15 Claims, 6 Drawing Sheets

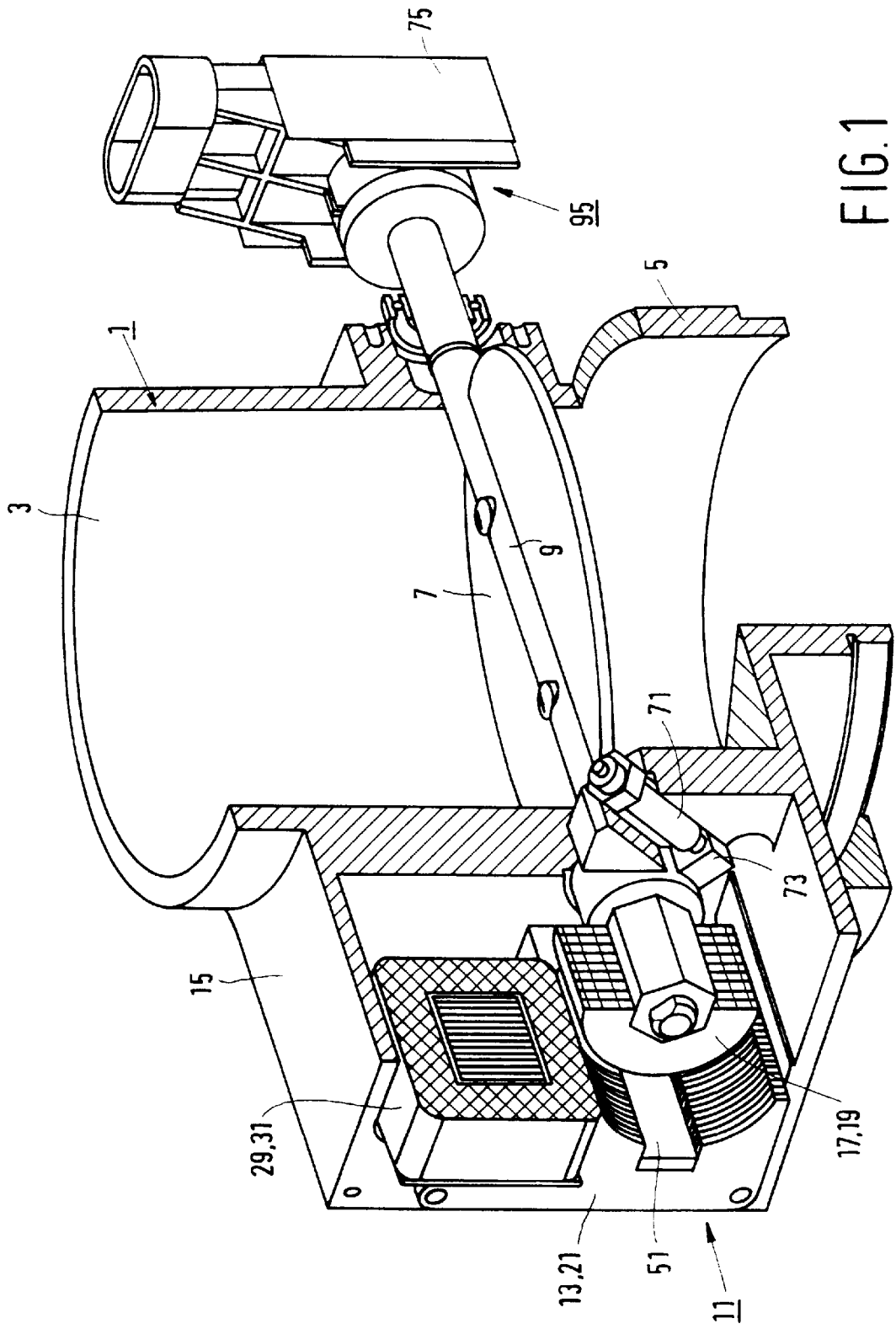

ELECTRICAL ACTUATOR WITH A REFINED CASCADE CONTROL UNIT

BACKGROUND OF THE INVENTION

1. Field of the Invention

The invention relates to an electrical actuator comprising a first actuator body, a second actuator body which is pivotable with respect to the first actuator body through an angle of rotation about an axis of rotation, electrical energizing means for exerting an electromagnetic torque on the second actuator body, and an electrical control unit for controlling the angle of rotation of the second actuator body, said control unit comprising an electrical input for receiving an electrical signal corresponding to a required angle of rotation of the second actuator body and an electrical output for supplying an electrical signal corresponding to a required electrical current through the energizing means.

The invention further relates to a throttle device for use in an air inlet of an internal-combustion engine, which throttle device comprises a throttle-valve housing, an air passage which is connectable to the air inlet, a throttle-valve which is journalled in the throttle-valve housing so as to be pivotable in the air passage, and an electrical actuator for pivoting the throttle-valve.

2. Description of the Prior Art

An electrical actuator of the kind mentioned in the opening paragraph is disclosed in chapter 15.2 entitled "Linear Position Control" of the book "Control of Electrical Drives" by W. Leonhard, ISBN 3-540-13650-9 Springer-Verlag Berlin Heidelberg New York Tokyo. The control unit of the known actuator has a so-called cascade control structure comprising a system of several superimposed control loops for the electromagnetic torque, the angular acceleration, the speed of rotation and the angle of rotation of the actuator. The control loop for the electromagnetic torque comprises a control member with an electrical input for receiving an electrical signal corresponding to a required angular acceleration and an electrical output for supplying the electrical signal corresponding to the required electrical current through the energizing means. The cascade control structure provides a natural control sequence which corresponds to the structure and operation of the actuator. As a result, the control unit has a transparent structure and can be designed and optimized step by step.

A drawback of the known actuator is that the response of the control unit of the known actuator to alterations of the signal corresponding to the required angle of rotation is relatively slow if the dependence of the electromagnetic, magnetostatic or mechanical characteristics of the actuator on the angle of rotation of the second actuator or on the current through the energizing means is strongly non-linear. Due to the non-linearity of said characteristics, the number of iterative calculations which have to be made by the control unit before a required angle of rotation is achieved is relatively high.

SUMMARY OF THE INVENTION

It is an object of the invention to provide an electrical actuator which has a control unit with a cascade control structure, wherein the response time of the control unit to alterations of the signal corresponding to the required angle of rotation is improved.

According to the invention, the the control unit comprises a first control member with an electrical input for receiving the signal corresponding to the required angle of rotation and an electrical output for supplying an electrical signal corresponding to a required electromagnetic torque on the second actuator body, and a second control member with an electrical input for receiving the signal corresponding to the required electromagnetic torque and an electrical output for supplying the signal corresponding to the required current. Owing to the use of said first and second control members, the control unit comprises a refined control sequence wherein the signal corresponding to the required angle of rotation is first converted into a signal corresponding to the required electromagnetic torque by the first control member and subsequently the signal corresponding to the required electromagnetic torque is converted into the signal corresponding to the required current through the energizing means by the second control member. In this way, the first control member allows for a specific calculation of the required electromagnetic torque, taking into account the mechanical and magnetostatic properties of the actuator, while the second control member allows for a specific calculation of the required current taking into account the electromagnetic properties of the actuator. Since the mechanical and magnetostatic properties of the actuator on the one hand and the electromagnetic properties of the actuator on the other hand are taken into account separately, knowledge about these properties of the actuator is taken into account in a relatively specific and detailed manner, so that the calculations of the first and second control members are relatively accurate and the co-operation between the first and second control members is very effective. In this way the number of iterative calculations which have to be made by the control members before a required angle of rotation is achieved is limited.

A particular embodiment of an electrical actuator according to the invention is characterized in that the first control member comprises an electrical adder with an electrical output for supplying the signal corresponding to the required electromagnetic torque, the adder comprising a first electrical input for receiving a feed-forward control signal determined by the signal corresponding to the required angle of rotation, and a second electrical input for receiving a feedback control signal determined by the signal corresponding to the required angle of rotation and by an electrical signal which is supplied by an angle-of-rotation sensor and which corresponds to a measured angle of rotation of the second actuator body. By adding said feed-forward and feedback control signals, a fast and accurate calculation and control of the required electromagnetic torque is achieved.

A further embodiment of an electrical actuator according to the invention is characterized in that the first control member comprises a profile generator having a first electrical input for receiving the signal corresponding to the required angle of rotation, a second electrical input for receiving the signal corresponding to the measured angle of rotation, and an electrical output for supplying an electrical reference signal which corresponds to an angle-of-rotation-versus-time profile generated by the profile generator, the feed-forward control signal being proportional to a required angular acceleration of the second actuator body corresponding to the angle-of-rotation-versus-time profile. The angle-of-rotation-versus-time profile generated by the profile generator extends from the measured angle of rotation to the required angle of rotation. In this way, an instantaneous, discontinuous alteration of the signal corresponding to the required angle of rotation is converted by the profile generator into a profile of the reference signal which is feasible in view of the controllability and the dynamical properties of the electrical actuator.

A special embodiment of an electrical actuator according to the invention is characterized in that the first control member comprises a comparator having a first electrical input for receiving the signal corresponding to the measured angle of rotation, a second electrical input for receiving the reference signal, and an electrical output for supplying a differential signal which is proportional to a difference between the signal corresponding to the measured angle of rotation and the reference signal, the first control member further comprising a regulator with an electrical input for receiving the differential signal and an electrical output for supplying the feedback control signal. Said regulator determines the feedback control signal in such a way that said differential signal is equalized to zero, so that the measured angle of rotation accurately changes according to the angle-of-rotation-versus-time profile generated by the profile generator. By making the regulator to control said differential signal instead of a signal which is proportional to a difference between the signal corresponding to the measured angle of rotation and the signal corresponding to the required angle of rotation, it is achieved that so-called wind-up effects and dynamic overshoot of the regulator are avoided.

A particular embodiment of an electrical actuator according to the invention is characterized in that the adder comprises a third electrical input for receiving an electrical signal corresponding to a load torque which is exerted on the second actuator body and which is dependent on the angle of rotation of the second actuator body and substantially independent of the current through the energizing means. The load torque is exerted on the second actuator body, for example, by a mechanical, magnetic or pneumatic device such as a mechanical spring which is deformed when the second actuator body is pivoted, and is used, for example, to restore the second actuator body to a rest position when the current through the energizing means is zero. The addition of the electrical signal corresponding to the load torque to the feed-forward and feedback control signals mentioned above has the result that, the feed-forward control signal need not be calculated so as to include a component of the electromagnetic torque necessary for compensating said load torque. In this way, the response time and accuracy of the control unit are further improved.

A further embodiment of an electrical actuator according to the invention is characterized in that the load torque is a magnetostatic torque which is exerted on the second actuator body by the first actuator body. Said magnetostatic torque is a magnetic torque which is exerted by the first actuator body on the second actuator body independently of the current through the energizing means. The magnetostatic torque is dependent on the angle of rotation of the second actuator body and constitutes a restoring torque urging the second actuator body towards a rest position. Since the magnetostatic torque is determined by the structure of the first and second actuator bodies, the signal corresponding to the load torque can be calculated as a function of the angle of rotation of the second actuator body.

A special embodiment of an electrical actuator according to the invention is characterized in that the first control member comprises an electrical memory with an electrical input for receiving the signal corresponding to the measured angle of rotation and an electrical output for supplying the signal corresponding to the load torque, the memory being provided with a tabular relation between the load torque and the angle of rotation. Since the relation between the load torque and the angle of rotation of the second actuator body is stored in said memory of the first control member in a tabular form, the value of the load torque is relatively accurate and is read out in a simple way without substantial delay. In this way, the response time and accuracy of the control unit are further improved.

A further embodiment of an electrical actuator according to the invention is characterized in that the first control member comprises a disturbance observer for calculating a loading torque exerted on the second actuator body on the basis of a mathematical model of the electrical actuator, the adder comprising a third electrical input for receiving an electrical output signal of the disturbance observer corresponding to a value of the loading torque calculated by the disturbance observer. During operation, the angle of rotation of the second actuator body is influenced or disturbed by internal disturbing loading torques such as friction and stiction torques of the bearings of the electrical actuator and a magnetostatic torque exerted on the second actuator body by the first actuator body, and by external disturbing loading torques exerted on the second actuator body. Such disturbing loading torques are not directly measurable or measurable with great difficulty only. The disturbance observer calculates the total disturbing loading torque on the basis of a mathematical model of the electrical actuator, i.e. on the basis of a set of first-order differential equations describing the physics of the electrical actuator. The addition of the output signal of the disturbance observer to the feed-forward and feedback control signals has the result that the feedback control signal need not be calculated by the regulator of the first control member so as to include a component of the required electromagnetic torque necessary for compensating the disturbing loading torque. In this way, the required convergence time of the feedback control loop and, consequently, the response time of the control unit are strongly improved.

A particular embodiment of an electrical actuator according to the invention is characterized in that the first control member comprises an electrical limiter for limiting the signal corresponding to the required electromagnetic torque if said signal exceeds a predetermined limit value. In this way, the value of the required electromagnetic torque to be generated by the energizing means is limited to a value which is feasible in view of the mechanical, electrical and thermal properties of the actuator, so that an electromagnetic overtorque, which could lead to damage or malfunction of the actuator, is avoided.

A further embodiment of the electrical actuator according to the invention is characterized in that the second control member comprises an electrical memory with a first electrical input for receiving the signal corresponding to the required electromagnetic torque, a second electrical input for receiving the signal corresponding to the measured angle of rotation, and an electrical output for supplying the signal corresponding to the required current, the memory being provided with a tabular relation between the electromagnetic torque, the angle of rotation and the current. Since the electromagnetic torque is determined by the structure of the first and second actuator bodies and the energizing means, the signal corresponding to the required electromagnetic torque can be calculated as a function of the angle of rotation of the second actuator body and the electrical current through the energizing means. Since the relation between the electromagnetic torque, the angle of rotation of the second actuator body and the current through the energizing means is stored in said memory of the second control member in a tabular form, the value of the current is relatively accurate and is read out in a simple way without substantial delay. In this way, the response time and accuracy of the control unit are further improved.

A special embodiment of an electrical actuator according to the invention is characterized in that the control unit comprises a comparator having a first electrical input for receiving the signal corresponding to the required current, a second electrical input for receiving an electrical signal which is supplied by an electrical current sensor and which corresponds to a measured current through the energizing means, and an electrical output for supplying a differential signal which is proportional to a difference between the signal corresponding to the required current and the signal corresponding to the measured current, the control unit further comprising a regulator with an electrical input for receiving said differential signal and an electrical output for supplying an electrical signal corresponding to an electrical current supplied to the energizing means. Said comparator, current sensor and regulator belong to a current-control loop of the control unit. Said regulator determines the signal corresponding to the electrical current supplied to the energizing means in such a way, that said differential signal is equalized to zero, so that the measured current through the energizing means accurately equals the required current determined by the control unit.

A further embodiment of an electrical actuator according to the invention is characterized in that the disturbance observer has an electrical input for receiving the signal corresponding to the measured current through the energizing means, the disturbance observer calculating the angle of rotation, an angular velocity of the second actuator body, and the loading torque on the basis of three state equations for the electrical actuator. The signal corresponding to the measured current is supplied by the current sensor which is used in the current-control loop of the control unit. Since the control unit comprises a current-control loop, the value of the current through the energizing means of the electrical actuator is imposed by the current-control loop and not by an electrical voltage imposed on the energizing means. In this manner, the value of the current through the energizing means is prescribed by the current-control loop, so that the mathematical model of the actuator underlying the disturbance observer can dispense with a usual differential equation for the current as a function of an imposed voltage. Since for these reasons the mathematical model comprises only three state equations, the disturbance observer is relatively simple and suitable for on-line computation.

A still further embodiment of an electrical actuator according to the invention is characterized in that the disturbance observer comprises a further electrical input for receiving the signal corresponding to the measured angle of rotation, a comparator for determining a deviation between the measured angle of rotation and the calculated angle of rotation, and an adder for correcting the calculated angle of rotation, the calculated angular velocity, and the calculated loading torque by a value proportional to said deviation. In this embodiment, inaccuracies of the values of the angle of rotation, the angular velocity, and the loading torque calculated by the disturbance observer and caused by inaccuracies of the mathematical model underlying the disturbance observer, are corrected by a feedback loop. The corrected angle of rotation is the sum of the calculated angle of rotation and the product of said deviation and a first weighing factor, the corrected angular velocity is the sum of the calculated angular velocity and the product of said deviation and a second weighing factor, and the corrected loading torque is the sum of the calculated loading torque and the product of said deviation and a third weighing factor, the first, second and third weighing factors being determined by means of a so-called pole-placement method.

A particular embodiment of an electrical actuator according to the invention is characterized in that the control unit comprises an electrical limiter for limiting the signal corresponding to the current if said signal exceeds a predetermined limit value. In this way, the value of the electrical current through the energizing means is limited to a value which is feasible in view of the thermal properties of the energizing means, so that an overcurrent, which could lead to overheating of the energizing means and the actuator, is avoided.

A throttle device of the kind mentioned in the opening paragraph is characterized in that the electrical actuator applied therein is an electrical actuator according to the invention. The throttle device is used in an air inlet of an internal-combustion engine of a vehicle and is adjustable, for example, by means of an accelerator pedal. The accelerator pedal is not mechanically coupled to the throttle-valve of the throttle device, but the electrical actuator is provided with an electrical input for receiving an electrical signal corresponding to a required angle of rotation of the throttle-valve in the air passage of the throttle device, said electrical signal being supplied, for example, by an electronic motor-management system which also controls the fuel-injection and ignition systems of the internal-combustion engine. The angle of rotation of the throttle-valve in the air passage of the throttle device is adjusted by the motor-management system not only as a function of the accelerator-pedal position, but also as a function of, for example, the r.p.m. of the engine, the inlet-air pressure and temperature, and the engine temperature. In this way, the performance, the fuel consumption and the composition of the exhaust-gases of the internal-combustion engine are improved. Since the throttle-valve of the throttle device is actuated by an electrical actuator according to the invention, the angle of rotation of the throttle-valve required by the motor-management system is achieved in a very accurate manner and the response time which is necessary for carrying out alterations of the required angle of rotation is strongly limited.

BRIEF DESCRIPTION OF THE DRAWING

For a fuller understanding of the invention, reference is had to the following description taken in connection with the following drawing, in which:

FIG. 1 diagrammatically shows a throttle device according to the invention, used in an air intake of an internal-combustion engine.

DETAILED DESCRIPTION OF THE PREFERRED EMBODIMENTS

Figure 2A:
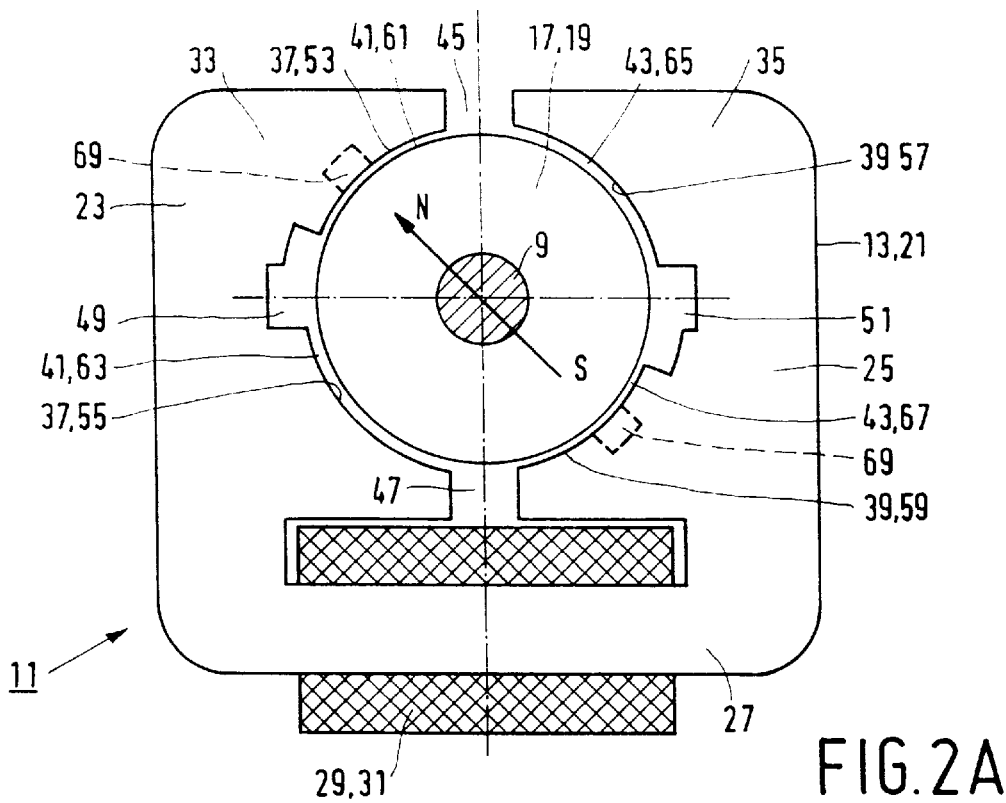
FIG. 2a is a cross-section of an electrical actuator according to the invention, applied in the throttle device of FIG. 1, in a non-energized condition.

The throttle device shown in FIG. 1 comprises a throttle-valve housing 1 with a tubular air passage 3 and a flange 5 by means of which the throttle device can be connected to an air inlet or manifold of an internal-combustion engine not shown in the drawing. The throttle device further comprises a disc-shaped throttle valve 7 which is mounted on a shaft 9 extending diametrically through the air passage 3. The shaft 9 is pivotably journalled in the flange 5 of the throttle-valve housing 1, so that the throttle valve 7 is pivotable in the air passage 3. When the throttle valve 7 is pivoted, the aperture of the air passage 3 and the air flow to the combustion chambers of the internal-combustion engine are altered.

Figure 2B:
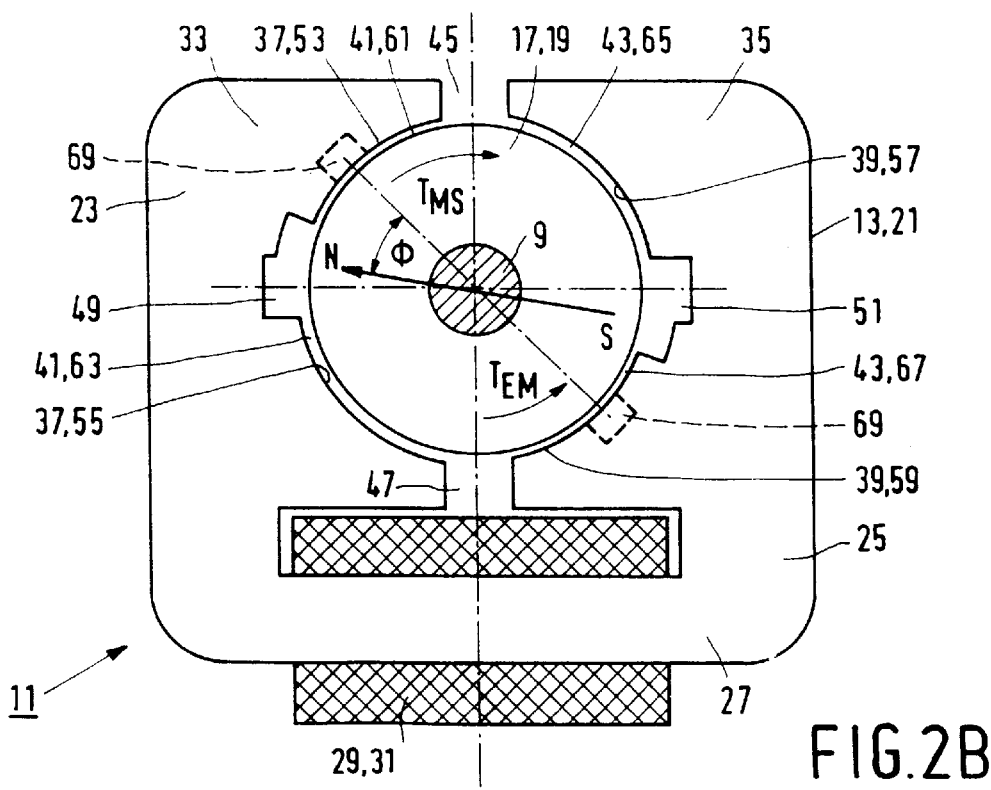
FIG. 2b shows the electrical actuator of FIG. 2a in an energized condition, FIG. 3 schematically shows a control unit of the electrical actuator of FIG. 2a, FIG. 4a shows an angle-of-rotation-versus-time profile of the electrical actuator required by a motor-management system of the engine.

The throttle valve 7 is pivotable in the air passage 3 by means of an electrical actuator 11 comprising a first actuator body 13 which is mounted in an actuator housing 15 of the throttle-valve housing 1 and a second actuator body 17 which is mounted on the shaft 9. As FIGS. 2a and 2b show, the second actuator body 17 comprises a cylindrical permanent-magnet rotor body 19 which is diametrically magnetized and has a north pole N and a south pole S. The first actuator body 13 comprises a U-shaped stator body 21 made of a material having a high magnetic permeability, such as sintered iron, or of magnetic-steel laminations. The U-shaped stator body 21 comprises two limbs 23, 25 which are interconnected by a base 27. The electrical actuator 11 further comprises an energizing means 29 having an electrical coil 31 which is supported by the base 27. The limbs 23, 25 of the stator body 21 are each provided with a pole shoe 33, 35, while the pole shoes 33, 35 each have a curved surface 37, 39. As FIGS. 2a and 2b show, the curved surfaces 37, 39 of the pole shoes 33, 35 surround the permanent-magnet rotor body 19, the surface 37 defining an air gap 41 between the rotor body 19 and the pole shoe 33 and the surface 39 defining an air gap 43 between the rotor body 19 and the pole shoe 35. Furthermore, a first gap 45 and a second gap 47 are present between the pole shoes 33, 35, while a first slot 49 is centrally provided in the surface 37 of the pole shoe 33, and a second slot 51 is centrally provided in the surface 39 of the pole shoe 35. In this way, the surface 37 is divided into a first surface portion 53 and a second surface portion 55, and the surface 39 is divided into a first surface portion 57 and a second surface portion 59, while the air gap 41 is divided into a first air-gap portion 61 and a second air-gap portion 63, and the air gap 43 is divided into a first air-gap portion 65 and a second air-gap portion 67. As FIGS. 2a and 2b show, the width of the diametrically opposed air-gap portions 61, 67 is smaller than the width of the diametrically opposed air-gap portions 63, 65.

Since the width of the air-gap portions 61, 67 is smaller than the width of the air-gap portions 63, 65, a magnetostatic torque $T_{MS}$ is exerted by the first actuator body 13 on the second actuator body 17, urging the second actuator body 17 into a rest position shown in FIG. 2a when the electrical coil 31 is not energized. To increase the magnetostatic torque $T_{MS}$, permanent auxiliary magnets 69, which are indicated in FIGS. 2a and 2b with broken lines, may alternatively be mounted in the first surface portion 53 of the pole shoe 33 and in the second surface portion 59 of the pole shoe 35. When the electrical coil 31 is energized, an electromagnetic torque $T_{EM}$ is exerted on the second actuator body 17, and the second actuator body 17 is rotated from the rest position shown in FIG. 2a towards a fixed position shown in FIG. 2b which is characterized by an angle of rotation φ of the second actuator body 17 relative to the rest position. Leaving the external forces on the throttle-valve 7 out of consideration, the electromagnetic torque $T_{EM}$ equals the magnetostatic torque $T_{MS}$ in the position shown in FIG. 2b. When the current through the coil 31 is switched off, the second actuator body 17 and the throttle valve 7 will return to their rest position again under the influence of the magnetostatic torque $T_{MS}$. The value of the angle of rotation φ in the fixed position shown in FIG. 2b is determined by the value of the electrical current through the electrical coil 31 and is adjustable by adjusting the current through the coil 31 in a manner which is described below.

It is noted that the rest position of the electrical actuator 11 shown in FIG. 2a does not correspond exactly to the position occupied by the second actuator body 17 and the throttle valve 7 when the electrical coil 31 is not energized. As FIG. 1 shows, the throttle device also comprises a mechanical stop 71, and the second actuator body 17 comprises a cam 73 which rests against the stop 71 when the coil 31 is not energized. The position of the second actuator body 17 in which the cam 73 rests against the stop 71 differs slightly from the position of the second actuator body 17 shown in FIG. 2a, so that the cam 73 rests against the stop 71 under the influence of a magnetostatic torque $T_{MS,0}$. As FIG. 1 shows, this position corresponds to a so-called limp-home position of the throttle valve 7 in the air passage 3 which differs slightly from a so-called idling position of the throttle valve 7 in which the aperture of the air passage 3 is minimal. In the limp-home position of the throttle valve 7, which occurs, for example, when the electrical-energy supply of the throttle device fails, the aperture of the air passage 3 allows for a small air flow towards the combustion chambers of the internal-combustion engine, so that an emergency operation of the engine is still possible. The stop 71 is mechanically adjustable, so that the air flow through the air passage 3 in the limp-home position of the throttle valve 7 is adjustable. In all other positions of the throttle valve 7, including the idling and full-throttle positions, in which the aperture of the air passage 3 is minimal and maximal respectively, an electrical current is supplied through the coil 31.

As FIG. 1 shows, the electrical actuator 11 further comprises an electrical control unit 75 by means of which the angle of rotation φ of the throttle valve 7 is controlled. The control unit 75 is diagrammatically shown in FIG. 3 and comprises an electrical input 77 for receiving an electrical signal $u_φ$ which corresponds to a required angle of rotation $φ_R$ of the second actuator body 17 and the throttle valve 7, and an electrical output 79 for supplying an electrical signal $u_c$ which determines an electrical current through the energizing means 29 of the actuator 11. The signal $u_φ$ is supplied by an electronic motor-management management system of the internal-combustion engine, which system is not shown in the drawing. The motor-management system determines the value of the signal $u_φ$ not only as a function of the position of an accelerator pedal operated by a driver, but also as a function of other parameters such as, for example, the r.p.m. of the engine, the pressure and temperature of the inlet-air, and the engine temperature. Furthermore, the motor-management system controls the idling speed of the engine during and after a cold start of the engine, so that usual air-bypass systems are not necessary. The motor-management system also controls the fuel-injection and ignition devices of the engine. In this way, the operation of the fuel-injection, ignition and throttle devices of the engine are attuned to each other, so that the performance, the fuel consumption and the composition of the exhaust-gases of the engine are improved.

Figure 3:
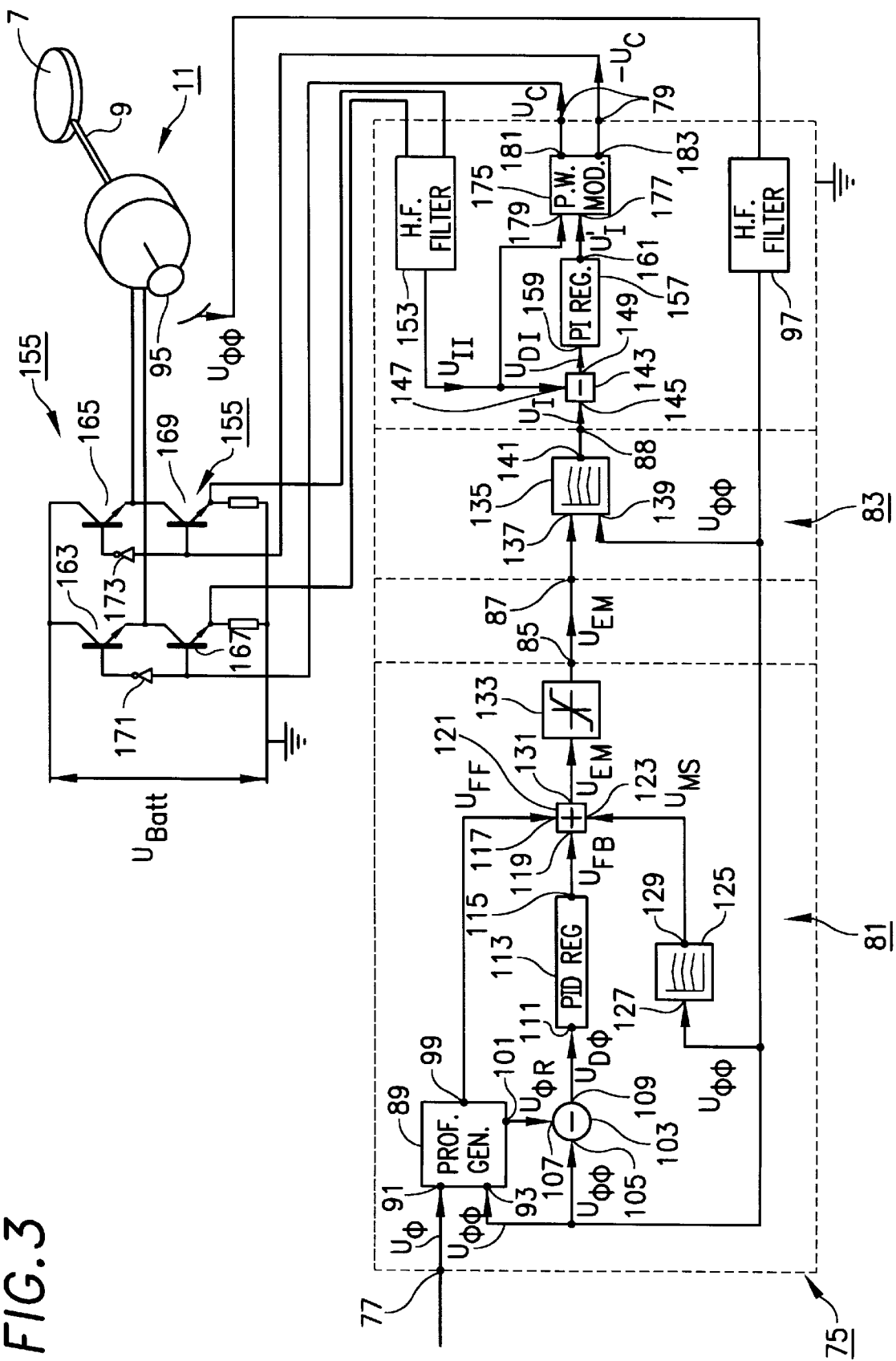

As FIG. 3 further shows, the control unit 75 comprises a first control member 81 and a second control member 83. The first control member 81 comprises the electrical input 77 of the control unit 75 and an electrical output 85 for supplying an electrical signal $u_{EM}$ which corresponds to a required electromagnetic torque $T_{EM}$ to be exerted on the second actuator body 17. The second control member 83 comprises an electrical input 87 for receiving the signal $u_{EM}$ from the first control member 81 and an electrical output 88 for supplying an electrical signal $u_I$ which corresponds to a required electrical current through the energizing means 29.

Figure 4A:
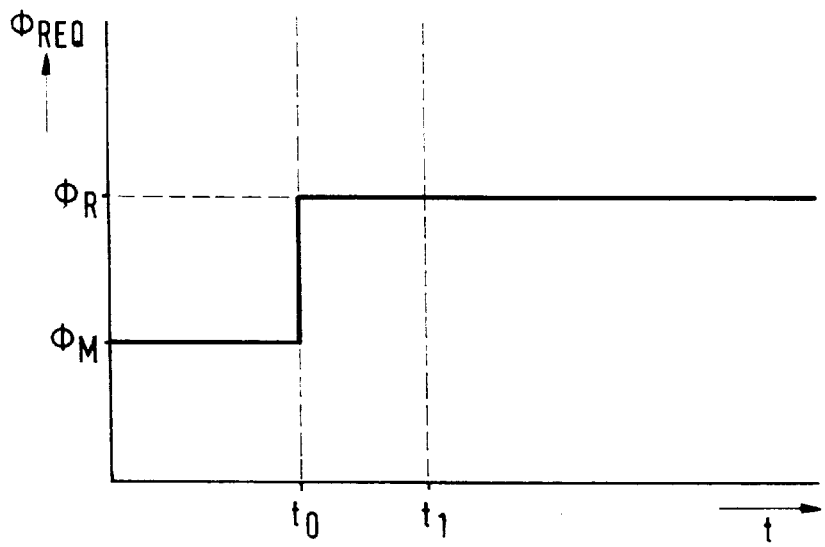
FIG. 4b shows an angle-of-rotation-versus-time profile generated by a profile generator of the control unit of FIG. 3.
FIG. 4c shows an angular-acceleration-versus-time profile corresponding to the angle-of-rotation-versus-time profile of FIG. 4b, FIG. 5 schematically shows an alternative control unit of the electrical actuator of FIG. 2a, and FIG. 6 schematically shows a disturbance observer of the alternative control unit of FIG. 5.
Figure 4B:
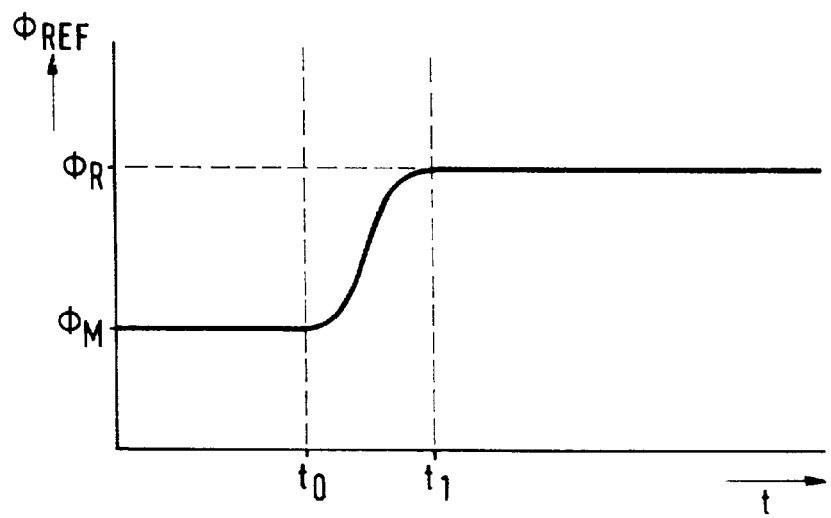
Figure 4C:
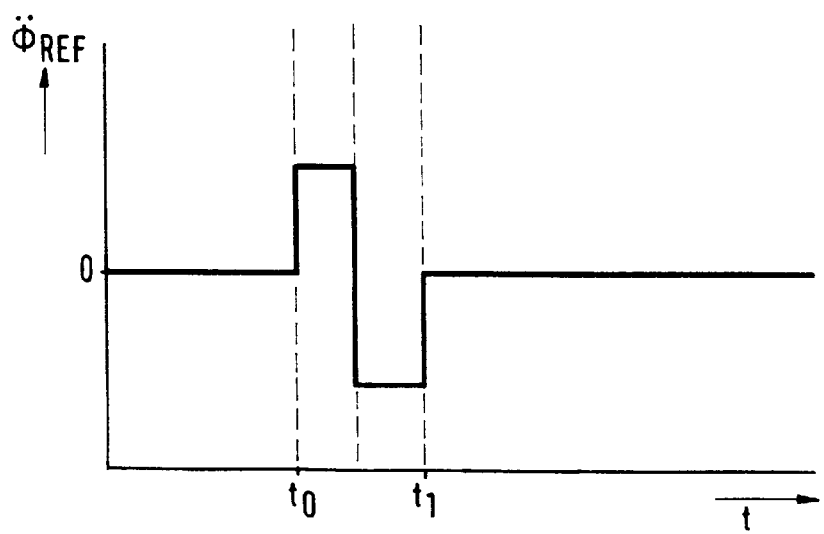

As FIG. 3 shows, the first control member 81 comprises a profile generator 89 with a first electrical input 91 for receiving the signal $u_\phi$ and a second electrical input 93 for receiving an electrical signal $u_{\phi\phi}$ which corresponds to a measured angle of rotation $\phi_M$ of the second actuator body 17 and the throttle valve 7. The signal $u_{\phi\phi}$ is supplied by an angle-of-rotation sensor 95 of the throttle device via a usual high-frequency filter 97. As FIG. 1 shows, the angle-of-rotation sensor 95 is mounted on the throttle-valve housing 1 near an end of the shaft 9 which is remote from the electrical actuator 11. The profile generator 89 generates an angle-of-rotation-versus-time profile which extends from a measured actual angle of rotation $\phi_M$ to the required angle of rotation $\phi_R$. FIG. 4a shows an example of an angle-of-rotation-versus-time profile required by the motor-management system where the required angle of rotation discontinuously alters from $\phi_M$ to $\phi_R$ at a point in time $t_0$. Such a profile cannot be realized by the electrical actuator 11 because the necessary electromagnetic torque is infinitely high. FIG. 4b shows an angle-of-rotation-versus-time profile generated by the profile generator 89 where the angle of rotation smoothly runs from $\phi_M$ to $\phi_R$ between the points in time $t_0$ and $t_1$. FIG. 4c shows an angular-acceleration-versus-time profile which corresponds to the angle-of-rotation-versus-time profile of FIG. 4b. The profile generator 89 comprises a first electrical output 99 for supplying a feed-forward control signal $u_{FF}$ which is the product of an angular acceleration required according to the angular-acceleration-versus-time profile and a moment of inertia of the pivotable parts of the throttle device. The signal $u_{FF}$ therefore corresponds to an electromagnetic-torque component necessary for realizing said angular acceleration. The profile generator 89 further comprises a second electrical output 101 for supplying an electrical reference signal $u_{\phi R}$ which corresponds to the angle-of-rotation-versus-time profile generated by the profile generator 89. In this way, an instantaneous, discontinuous alteration of the signal $u_\phi$, which is supplied by the motor-management system, is convertible by the profile generator 89 into profiles of the feed-forward control signal $u_{FF}$ and the reference signal $u_{\phi R}$ which are feasible not only in view of the dynamic properties of the electrical actuator 11 but also in view of the controllability of the actuator 11.

As FIG. 3 further shows, the first control member 81 comprises a comparator 103 with a first electrical input 105 for receiving the signal $u_{\phi\phi}$ and a second electrical input 107 for receiving the reference signal $u_{\phi R}$. The comparator 103 comprises an electrical output 109 which supplies a differential signal $u_{D\phi}$ which is proportional to a difference between the signals $u_{\phi\phi}$ and $u_{\phi R}$. The differential signal $u_{D\phi}$ is supplied to an electrical input 111 of a PID-regulator 113 which further comprises an electrical output 115 for supplying a feedback control signal $u_{FB}$.

The feed-forward control signal $u_{FF}$ and the feedback control signal $u_{FB}$ are supplied to a first electrical input 117 and to a second electrical input 119, respectively, of an electrical adder 121 of the first control member 81. As FIG. 3 shows, the adder 121 further comprises a third electrical input 123 for receiving an electrical signal $u_{MS}$ which corresponds to an estimated magnetostatic torque $T_{MS}$ exerted by the first actuator body 13 on the second actuator body 17. The value of the magnetostatic torque $T_{MS}$, which urges the second actuator body 17 and the throttle-valve 7 towards the limp-home position as discussed above, depends on the angle of rotation $\phi$ and is substantially independent of the current through the energizing means 31. The relation between $T_{MS}$ and $\phi$ is determined by the structure and composition of the first and second actuator bodies 13, 17. Said relation is calculated or measured and is stored in a tabular form in an electrical memory 125 of the first control member 81, said memory comprising an electrical input 127 for receiving the signal $u_{\phi\phi}$ and an electrical output 129 for supplying the signal $u_{MS}$ to the adder 121. By storing the relation between the magnetostatic torque and the angle of rotation in a tabular form in said memory 125, it is achieved that the value of the magnetostatic torque is read out in an accurate and relatively simple manner without substantial delay. In this way, the supply of the signal $u_{MS}$ to the adder 121 does not increase the response time of the control unit 75.

The adder 121 comprises an electrical output 131 for supplying the electrical signal $u_{EM}$ corresponding to the required electromagnetic torque to be exerted on the second actuator body 17. The signal $u_{EM}$ is the mathematical sum of the signals $u_{FF}$, $u_{FB}$ and $u_{MS}$. In this way, the required electromagnetic torque $T_{EM}$ is the sum of the electromagnetic-torque component which is necessary for realizing the required angular acceleration of the throttle valve 7, the estimated magnetostatic torque $T_{MS}$, and a feedback electromagnetic-torque component represented by the signal $u_{FB}$. The PID-regulator 113 determines the signals $u_{FB}$ and $u_{EM}$ in such a manner that the differential signal $u_{D\phi}$ is equalized to zero, so that the measured angle of rotation of the throttle valve 7 changes accurately in accordance with the angle-of-rotation-versus-time profile generated by the profile generator 89. Since the comparator 103 does not, as is usual, determine a difference between the signals $u_{\phi\phi}$ and $u_\phi$, but determines the difference between the signals $u_{\phi\phi}$ and $u_{\phi R}$, the control of the signals $u_{FB}$ and $u_{EM}$ by the PID-regulator 113 is very stable, so that usual wind-up effects and dynamic overshoot of the PID-regulator 113 do not occur. Furthermore, the control of the signals $u_{FB}$ and $u_{EM}$ by the PID-regulator 113 is very fast as a result of the use of the adder 121. Since the signals $u_{FF}$ and $u_{MS}$ are added to the signal UFB, the PID-ergulator 113 need not calculate the electromagnetic-torque component necessary for realizing the required angular acceleration of the throttle valve 7 and the electromagnetic-torque component necessary for compensating the magnetostatic torque $T_{MS}$. The calculation of these electromagnetic-torque components by a PID-controller in a feedback control loop would demand several controller sampling times, the more so as the relation between the magnetostatic torque $T_{MS}$ and the angle of rotation $\phi$ is strongly non-linear, so that the response time of the control unit 75 would deteriorate and the chance of instabilities of the PID-controller would increase. With the adder 121, the PID-regulator 113 need only calculate a number of electromagnetic-torque components which are small relative to the electromagnetic-torque components mentioned before, such as a component compensating for air-flow forces and a component compensating for mechanical-friction forces. In this way, the response time and accuracy of the control unit 75 are improved.

As FIG. 3 shows, the first control member 81 further comprises an electrical limiter 133 for limiting the signal $u_{EM}$ when the signal $u_{EM}$ exceeds a predetermined limit value. Said limit value of the signal $u_{EM}$ is determined in such a way that the electromagnetic torque exerted on the second actuator body 17 and on the throttle valve 7 never exceeds a predetermined maximum torque value. In this way, mechanical damage or malfunctioning of the electrical actuator 11 as well as overheating of the energizing means 29 are avoided. When the signal $u_{EM}$ supplied by the adder 121 exceeds said predetermined limit value, the value of the signal $u_{EM}$ is adjusted to said limit value by the limiter 133.

As FIG. 3 further shows, the second control member 83 of the control unit 75 comprises an electrical memory 135 with a first electrical input 137 for receiving the signal $u_{EM}$ from the input 87 of the second control member 83, a second electrical input 139 for receiving the signal $u_{\phi\phi}$ from the angle-of-rotation sensor 95, and an electrical output 141 for supplying the electrical signal $u_I$ which corresponds to an electrical current through the electrical coil 31 of the energizing means 29 necessary for achieving the required electromagnetic torque $T_{EM}$. The value of the electromagnetic torque $T_{EM}$ is dependent on the angle of rotation $\phi$ of the second actuator body 17 and on the value of the electrical current through the coil 31. The relation between the electromagnetic torque $T_{EM}$, the angle of rotation $\phi$ and the current through the coil 31 depends on the structure and composition of the first and second actuator bodies 13, 17 and the energizing means 29. Said relation is calculated or measured and is stored in a tabular form in the memory 135. In this way, the value of the current necessary for achieving a required electromagnetic torque at the measured angle of rotation is read out from the memory 135 in an accurate and simple manner without substantial delay. It is noted that a calculation of the required current by a usual calculator would demand a substantial amount of time, the more so as the relation between the electromagnetic torque, the angle of rotation and the current is strongly non-linear. With the use of memory 135, the short response time of the control unit 75 obtained by the PID-regulator 113 in combination with the adder 121 is not deteriorated by the second control member 83.

The control unit 75 further comprises a comparator 143 having a first electrical input 145 for receiving the signal $u_I$ from the output 88 of the second control member 83, a second electrical input 147 for receiving an electrical signal $u_{II}$ which corresponds to a measured electrical current through the energizing means 29, and an electrical output 149 for supplying a differential signal $u_{DI}$ which is proportional to a difference between the signals $u_I$ and $u_{II}$. The signal $u_{II}$ is supplied by an electrical current sensor 151 via a usual high-frequency filter 153. The current sensor 151 measures the electrical current which is supplied to the energizing means 29 by a power end stage 155 of the electrical actuator 11. In FIG. 3, the current sensor 151 and the power end stage 155 are shown diagrammatically only. Furthermore, the control unit 75 comprises a PI-regulator 157 with an electrical input 159 for receiving the differential signal $u_{DI}$ and an electrical output 161 for supplying an electrical signal $u'_I$ which corresponds to the electrical current to be supplied to the energizing means 29 by the power end stage 155. The PI-regulator 157 determines the signal us in such a way that the differential signal $u_{DI}$ is equalized to zero, so that the measured current supplied by the power end stage 155 to the energizing means 29 equals the required current determined by the second control member 83.

As FIG. 3 further shows, the power end stage 155 of the electrical actuator 11 is fed by a constant electrical voltage of, for example, a battery. The power end stage 155 comprises four NPN-transistors, i.e. two upper transistors 163, 165 and two lower transistors 167, 169, and two electrical invertors 171, 173. The transistors 163, 165, 167, 169 and the invertors 171, 173 are interconnected in a usual bridge configuration. The transistors 163, 165, 167, 169 are driven in a usual manner by a pulse width modulator 175 of the control unit 75, which comprises a first electrical input 177 for receiving the signal $u'_I$ supplied by the PI-regulator 157 and a second electrical input 179 for receiving the signal $u_{II}$ supplied by the current sensor 151. A first electrical output 181 of the pulse width modulator 175 is connected to the base of lower transistor 167 and via the invertor 171 to the base of upper transistor 163, while a second electrical output 183 of the pulse width modulator 175 is connected to the base of lower transistor 169 and via the invertor 173 to the base of upper transistor 165. The signal $u'_I$ is converted by the pulse width modulator 175 into mutually complementary pulsatory drive signals $u_C$ and $-u_C$ at the first and second electrical outputs 181, 183, respectively, of the pulse width modulator 175. In dependence on the polarity of the drive signals $u_C$ and $-u_C$, the lower transistor 167 and the upper transistor 165 are opened whereby an electrical current in the energizing means 29 is admitted in one direction, or the lower transistor 169 and the upper transistor 163 are opened whereby an electrical current in the energizing means 29 is admitted in the opposite direction. The pulse width modulator 175 further comprises an electrical limiter for limiting the pulse width of the drive signals $u_C$ and $-u_C$ when the signal $u_{II}$ supplied by the current sensor 151 exceeds a predetermined limit value. In this way, the pulse width of the electrical current through the coil 31 is limited to a value which is feasible in view of the thermal properties of the energizing means 29. An overcurrent in the coil 31, which could lead to overheating of the energizing means 29 and the electrical actuator 11, is avoided in this way.

The control unit 75 described before has a so-called cascade control structure according to which the signal $u_\phi$ corresponding to a required angle of rotation is first converted into a signal corresponding to a required angular acceleration, the signal corresponding to the required angular acceleration being subsequently converted into a signal $u_{EM}$ corresponding to a required electromagnetic torque, and the signal $u_{EM}$ corresponding to the required electromagnetic torque being finally converted into a signal $u_I$ corresponding to a required electrical current through the energizing means 29. As described above, this refined cascade control structure with the first and second control members 81, 83 allows for a specific calculation of the required electromagnetic torque $T_{EM}$, taking into account the mechanical and magnetostatic properties of the electrical actuator 11, and for a specific calculation of the required current, taking into account the electromagnetic properties of the actuator 11. This refined cascade control structure leads to a response time of the control unit 75 which is short relative to common and usual control structures according to which the required current is calculated in an iterative manner by a feedback control loop without or with fewer intermediate control steps. Said common and usual control structures would require a high number of iterative calculations and therefore would lead to a long response time, particularly because the relation between the required current and the angle of rotation is strongly non-linear.

Figure 5:
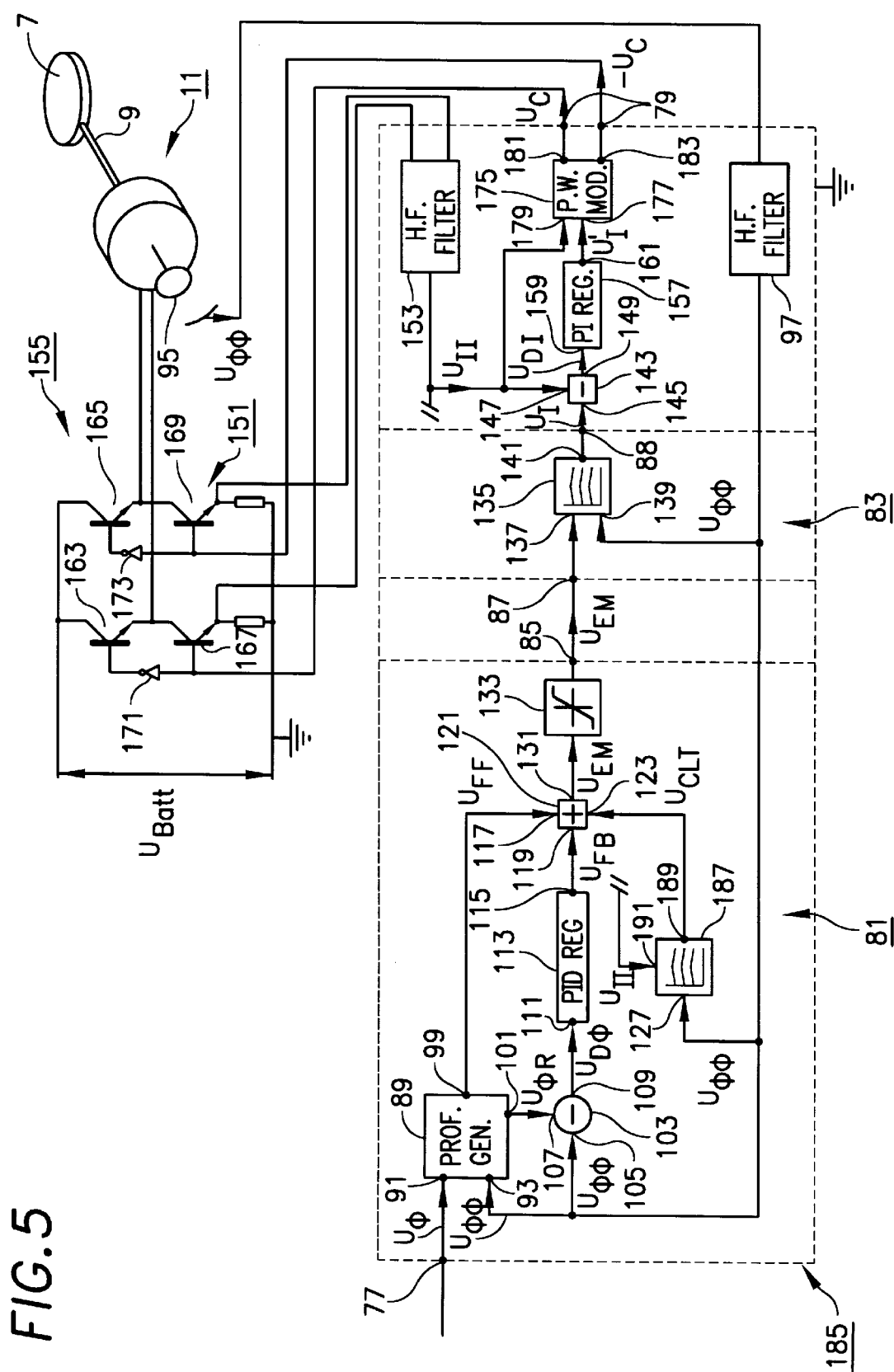

In the control unit 75 described before, the third input 123 of the adder 121 receives an electrical signal $u_{MS}$ corresponding to an estimated magnetostatic torque $T_{MS}$ exerted by the first actuator body 13 on the second actuator body 17. The magnetostatic torque $T_{MS}$ is an internal loading torque influencing or disturbing the angle of rotation of the second actuator body 17 and the throttle valve 7. The angle of rotation of the second actuator body 17 is also disturbed by other internal disturbing loading torques such as friction and stiction torques of the bearings of the electrical actuator 11. The angle of rotation of the second actuator body 17 is also disturbed by external disturbing loading torques exerted on the second actuator body 17 and the throttle valve 7 such as a torque caused by air-flow forces exerted on the throttle valve 7 by the air flowing through the air passage 3. FIG. 5 shows an alternative control unit 185 of the electrical actuator 11 in which the electrical memory 125 of the control unit 75 is replaced by a so-called disturbance observer 187 for calculating the total disturbing loading torque exerted on the second actuator body 17 and the throttle valve 7 on the basis of a mathematical model of the throttle device and the electrical actuator 11. The disturbance observer 187, which will be described in more detail hereinafter, comprises an electrical output 189 for supplying an electrical signal $u_{CLT}$ corresponding to a value of the loading torque calculated by the disturbance observer 187. Said signal $u_{CLT}$ is supplied to the third input 123 of the adder 121. By the use of the disturbance observer 187, a direct measurement of the disturbing loading torque, which is very difficult or even impossible, is avoided. Furthermore, the PID-regulator 113 need not calculate the electromagnetic-torque component necessary for compensating the total disturbing loading torque exerted on the second actuator body 17 and the throttle valve 7. With the disturbance observer 187, the PID-regulator 113 need only calculate a relatively small deviation between the calculated loading torque and a loading torque actually influencing the throttle valve 7 and the second actuator body 17. In this way, the response time and accuracy of the control unit 185 are further improved.

As mentioned before, the disturbance observer 187 is used for calculating the loading torque exerted on the second actuator body 17 and the throttle valve 7 on the basis of a mathematical model of the throttle device and the electrical actuator 11, so that a difficult and unreliable measurement of the loading torque is avoided. The mathematical model underlying the disturbance observer 187 is based upon a set of three first-order differential equations which read as follows:

$$J.d\omega/dt = k(\phi).I_{ACT} - T_{LOAD} \quad [1]$$

$$\omega = d\phi/dt \quad [2]$$

$$dT_{LOAD}/dt = 0 \quad [3]$$

Equation [1] is an equation of motion of the throttle valve 7 and the second actuator body 17, wherein J is the moment of inertia of the pivotable parts of the throttle device, ω is the angular velocity of the pivotable parts of the throttle device, $k(\phi).I_{ACT}$ is the electromagnetic torque $T_{EM}$ exerted on the second actuator body 17, $k(\phi)$ being a factor which is dependent on the angle of rotation φ and $I_{ACT}$ being the current through the energizing means 29, and $T_{LOAD}$ is the loading torque exerted on the throttle valve 7 and the second actuator body 17. Equation [2] describes the relation between the angular velocity ω and the angle of rotation φ of the throttle valve 7. Equation [3] comprises a simplifying assumption for the loading torque, namely that the loading torque is constant.

Since the value of the current $I_{ACT}$ through the energizing means 29 is determined by the PI-regulator 157 of the control unit 75 and not by the electrical voltage by which the power end stage 155 of the electrical actuator 11 is fed, the mathematical model underlying the disturbance observer 187 can dispense with a fourth differential equation describing a relation between the current through the energizing means 29 and the voltage imposed on the energizing means 29. As FIG. 5 shows, the disturbance observer 187 has a first electrical input 191 for receiving the signal $u_{II}$ supplied by the current sensor 151 and corresponding to the measured electrical current through the energizing means 29. The disturbance observer 187 calculates the angle of rotation φ, the angular velocity ω, and the loading torque $T_{LOAD}$ on the basis of the input signal $u_{II}$ and the three differential equations [1], [2] and [3] mentioned above. Since the mathematical model underlying the disturbance observer 187 comprises only three first-order differential equations, the disturbance observer 187 is relatively simple and suitable for on-line computation.

In a matrix form, the set of equations [1], [2] and [3] reads as follows:

$$\begin{pmatrix} d\phi/dt \\ d\omega/dt \\ dT_{LOAD}/dt \end{pmatrix} = \begin{pmatrix} 0 & 1 & 0 \\ 0 & 0 & -1/J \\ 0 & 0 & 0 \end{pmatrix} \cdot \begin{pmatrix} \phi \\ \omega \\ T_{LOAD} \end{pmatrix} + \begin{pmatrix} 0 \\ 1/J \\ 0 \end{pmatrix} \cdot k(\phi) \cdot I_{ACT}.$$

Furthermore, the disturbance observer 187 is based upon the following discretizations:

$$\phi_{k+1} = \phi_k + T.\omega_k + T^2/2J.k(\phi).I_{ACT} - T^2/2J.T_{LOAD,k};$$

$$\omega_{k+1} = \omega_k + T/J.k(\phi).I_{ACT} - T/J.T_{LOAD,k};$$

wherein $\phi_{k+1}$ and $\omega_{k+1}$ are the values of the angle of rotation and the angular velocity calculated by the disturbance observer 187 at a point of time k+1, wherein $\phi_k$, $\omega_k$, and $T_{LOAD,k}$ are the values of the angle of rotation, the angular velocity, and the loading torque calculated by the disturbance observer 187 at a point of time k, and wherein T is a time interval between the points of time k and k+1. With these discretizations, the set of equations [1], [2] and [3] in matrix form reads as follows:

$$x_{k+1} = \Phi \cdot x_k + H \cdot k(\phi) \cdot I_{ACT};$$

wherein $$x_k = \begin{pmatrix} \phi_k \\ \omega_k \\ T_{LOAD,k} \end{pmatrix}; x_{k+1} = \begin{pmatrix} \phi_{k+1} \\ \omega_{k+1} \\ T_{LOAD,k+1} \end{pmatrix};$$

$$\Phi = \begin{pmatrix} 1 & T & T^2/2J \\ 0 & 1 & -T/J \\ 0 & 0 & 1 \end{pmatrix}; H = \begin{pmatrix} T^2/2J \\ T/J \\ 0 \end{pmatrix}.$$

The vectors $x_k$ and $x_{k+1}$ are the state vectors for the points of time k and k+1, the matrix Φ is the system matrix, and the matrix H is the input matrix.

Figure 6:
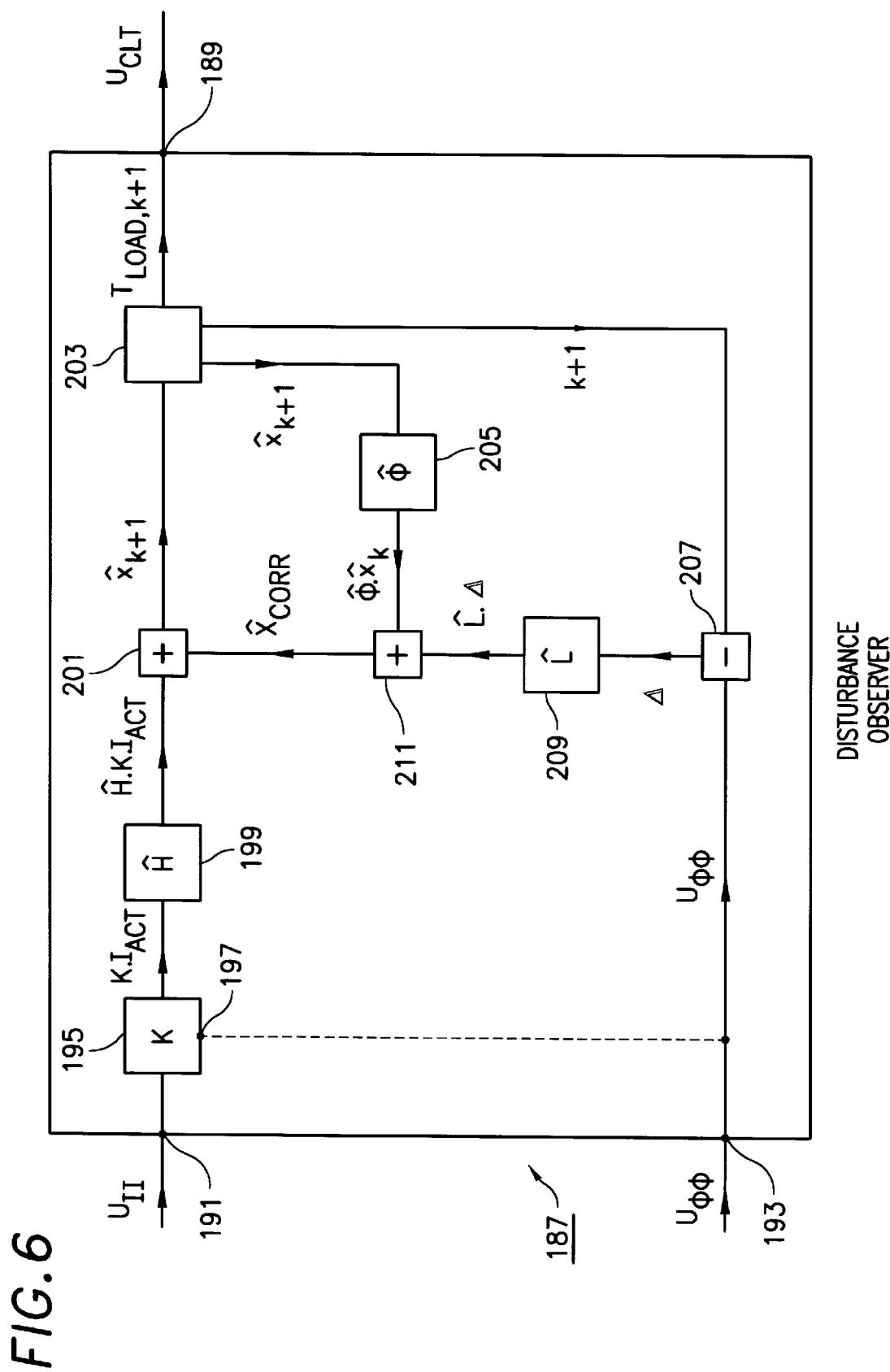

The equations [1], [2] and [3] are implemented in the disturbance observer 187 in the form of a computer program. FIG. 6 diagrammatically shows the disturbance observer 187 in the form of a number of function blocks representing the computer program. As mentioned before, the disturbance observer 187 comprises a first electrical input 191 for receiving the signal $u_{II}$ corresponding to the measured current $I_{ACT}$ through the energizing means 29. Furthermore, the disturbance observer 125 comprises a second electrical input 193 for receiving the signal $u_{\phi\phi}$ corresponding to the measured angle of rotation. The signal $u_{\phi\phi}$ is used by the disturbance observer 187 in a manner to be described hereinafter. As FIG. 6 further shows, the disturbance observer 187 comprises a first function block 195 for multiplying the value $I_{ACT}$ by a constant factor K representing an average value of the factor $k(\phi)$. Alternatively, the function block 195 may contain a relation between $k(\phi)$ and $\phi$, for example, in a tabular form, in which case the function block 195 comprises an input 197 for receiving the input signal $u_{\phi\phi}$. In FIG. 6, the alternative input 197 is shown with a broken line. The disturbance observer 187 further comprises a second function block 199 for multiplying the input matrix H by the value $K.I_{ACT}$ or by the value $k(\phi).I_{ACT}$, an output of the function block 199 representing the vector $H.k(\phi).I_{ACT}$. The disturbance observer 187 further comprises a third function block 201 for adding up the vector $H.k(\phi).I_{ACT}$ and a vector $x_{CORR}$ to be described hereinafter, an output of the third function block 201 representing the new state vector $x_{k+1}$. Furthermore, the disturbance observer 187 comprises a fourth function block 203 for supplying the component $T_{LOAD,k+1}$ of the new state vector $x_{k+1}$ to the output 189 of the disturbance observer 187. Furthermore, the fourth function block 203 leads the state vector $x_{k+1}$ to a fifth function block 205 which multiplies the state vector $x_{k+1}$ by the system matrix $\Phi$. An output of the fifth function block 205 represents the value $\omega.x_k$.

As described before, the disturbance observer 187 calculates the values of the angle of rotation $\phi$, the angular velocity $\omega$, and the loading torque $T_{LOAD}$ on the basis of the set of equations [1], [2] and [3]. Since the value of the angle of rotation $\phi$ is also measured by the angle-of-rotation sensor 95, the measured value of the angle of rotation can be used to correct inaccuracies of the mathematical model underlying the disturbance observer 187 and inaccuracies of the discretizations of the equations [1], [2] and [3]. For this purpose, the disturbance observer 187 comprises a sixth function block 207 for comparing the measured value of the angle of rotation represented by the input signal $u_{\phi\phi}$ and the calculated value $\phi_{k+1}$ of the angle of rotation which is supplied by the fourth function block 203. An output value $\Delta\phi$ of the sixth function block 207 corresponds to a deviation between said measured angle of rotation and said calculated angle of rotation and is led to a seventh function block 209 which multiplies a corrector matrix L by the value $\Delta\phi$. The corrector matrix L comprises a first weighing factor $L_1$, a second weighing factor $L_2$, and a third weighing factor $L_3$ for respectively correcting the calculated value of the angle of rotation, the calculated value of the angular velocity, and the calculated value of the loading torque, said weighing factors being determined by means of a so-called pole-placement method which is known and usual per se. An output vector $L.\Delta\phi$ of the seventh function block 209 is led to an eighth function block 211 of the disturbance observer 187 which is used for adding up the output vector $L.\Delta\phi$ of the seventh function block 209 and the vector $\Phi.x_k$. In this manner, an output vector $x_{CORR}$ of the eighth function block 211 reads as follows:

$$x_{CORR} = \Phi \cdot x_k + L \cdot \Delta\phi;$$

with $$L = \begin{pmatrix} L_1 \\ L_2 \\ L_3 \end{pmatrix}.$$

Therefore, the new state vector $x_{k+1}$ reads as follows:

$$x_{k+1} = \Phi.x_k + H.k(\phi).I_{ACT} + L.\Delta\phi.$$

In the electrical actuator 11 described above, the first actuator body 13 exerts a magnetostatic torque on the second actuator body 17, said magnetostatic torque being dependent on the angle of rotation of the second actuator body 17 relative to the first actuator body 13. It is noted that the invention also relates to other types of electrical actuators with a first actuator body, a second actuator body which is pivotable relative to the first actuator body through a limited angle of rotation, energizing means for exerting an electromagnetic torque on the second actuator body, and a control unit for controlling said angle of rotation. The actuator may, for example, be provided with a mechanical torsion spring for exerting a mechanical spring torque on the second actuator body instead of or in addition to the magnetostatic torque. In such a case, the memory 125 of the first control member 81 is omitted or replaced by a memory in which a relation between said mechanical spring torque and the angle of rotation is stored in a tabular form, said memory supplying an electrical signal corresponding to an estimated mechanical spring torque.

It is further noted that the signal $u_{EM}$ corresponding to the required electromagnetic torque may also be determined in an alternative way by the first control member 81, while the signal $u_I$ corresponding to the required electrical current through the energizing means 29 may also be determined in an alternative way by the second control member 83. In the first control member 81, for example, the profile generator 89 may be omitted or a comparator may be used having the signals $u_\phi$ and $u_{\phi\phi}$ as input signals. Furthermore, the memory 125 may be replaced by a calculator containing a mathematical relation between the magnetostatic torque and the angle of rotation. Furthermore, depending on the structure and composition of the electrical actuator, a different load torque exerted on the second actuator body in dependence of the angle of rotation may be determined by the memory 125 or calculator instead of the magnetostatic torque. Finally, the memory 135 of the second control member 83 may be replaced by a calculator containing a mathematical relation between the electromagnetic torque, the angle of rotation of the second actuator body, and the current through the energizing means.

It is finally noted that the electrical actuator according to the invention may also be applied in other devices in which the angular position of a shaft should be controlled to a constant or variable reference angle. The electrical actuator may, for example, be used in servo-actuated valves in chemical plants and power stations or in devices for deflecting the control surfaces of an aircraft. The actuator may be used as a so-called prime actuator without a transmission, in which case the actuator directly drives a body which is to be displaced, as in the embodiment of the invention described above, or in combination with a transmission for converting a rotational motion into another rotational motion or into a linear motion, in which case the linear position of a body can be accurately controlled by the electrical actuator.

What is claim is:

1. An electrical actuator comprising
   a first actuator body,
   a second actuator body which is rotatable with respect to the first actuator body about an axis of rotation,
   means for exerting a load torque on the second actuator body, which load torque urges said second actuator body toward a rest position with respect to said first actuator body,
   electrical energizing means for exerting an electromagnetic torque on the second actuator body, said electromagnetic torque acting oppositely to said load torque to cause said second actuator body to rotate through an angle of rotation $\phi$ from said rest position to a desired position, said angle $\phi$ being proportional to said electromagnetic torque, a first control member having an electrical input for receiving an electrical signal $u_\phi$ corresponding to a required angle of rotation $\phi_R$ of the second actuator body, and an electrical output for supplying an electrical signal $u_{EM}$ corresponding to the electromagnetic torque $T_{EM}$ which is required to achieve the required angle $\phi_R$, and a second control member having an electrical input for receiving the signal $u_{EM}$, and an electrical output for supplying a signal $u_I$ which is used to determine an electrical current supplied to said energizing means to exert the required electromagnetic torque $T_{EM}$.

2. An electrical actuator as in claim 1 wherein the first control member comprises an electrical adder with an electrical output for supplying the signal $u_{EM}$ corresponding to the required electromagnetic torque $T_{EM}$, the adder comprising a first electrical input for receiving a feed-forward control signal $u_{FF}$ determined by the signal $u_\phi$ corresponding to the required angle of rotation $\phi_R$, and a second electrical input for receiving a feedback control signal $u_{FB}$ determined by the signal $u_\phi$ corresponding to the required angle of rotation $\phi_R$ and by an electrical signal $u_{\phi\phi}$ which is supplied by an angle-of-rotation sensor and which corresponds to a measured angle of rotation $\phi_M$ of the second actuator body.

3. An electrical actuator as in claim 2 wherein the first control member further comprises a profile generator having a first electrical input for receiving the signal $u_\phi$ corresponding to the required angle of rotation $\phi_R$, a second electrical input for receiving the signal $u_{\phi\phi}$ corresponding to the measured angle of rotation $\phi_M$, and an electrical output for supplying an electrical reference signal $u_{\phi R}$ which corresponds to an angle-of-rotation-versus-time profile generated by the profile generator, the feed-forward control signal $u_{FF}$ being proportional to a required angular acceleration of the second actuator body corresponding to the angle-of-rotation-versus-time profile.

4. An electrical actuator as in claim 3 wherein the first control member further comprises a comparator having a first electrical input for receiving the signal corresponding to the measured angle of rotation $\phi_M$, a second electrical input for receiving the reference signal $u_{\phi R}$, and an electrical output for supplying a differential signal $u_{D\phi}$ which is proportional to a difference between the signal $u_{\phi\phi}$ corresponding to the measured angle of rotation $\phi_M$ and the reference signal $u_{\phi R}$, the first control member further comprising a regulator with an electrical input for receiving the differential signal $u_{D\phi}$ and, an electrical output for supplying the feedback control signal $u_{FB}$.

5. An electrical actuator as in claim 2 wherein the adder further comprises a third electrical input for receiving an electrical signal $u_{MS}$ corresponding to the load torque which is exerted on the second actuator body and which is dependent on the angle of rotation $\phi$ of the second actuator body and substantially independent of the current through the energizing means.

6. An electrical actuator as in claim 5 wherein the load torque is a magnetostatic torque $T_{MS}$ which is exerted on the second actuator body by the first actuator body.

7. An electrical actuator as in claim 5 wherein the first control member further comprises an electrical memory with an electrical input for receiving the signal $u_{\phi\phi}$ corresponding to the measured angle of rotation $\phi_M$ and an electrical output for supplying the signal $u_{MS}$ corresponding to the load torque, the memory being provided with a tabular relation between the load torque and the angle of rotation.

8. An electrical actuator as in claim 2 wherein the first control member further comprises a disturbance observer for calculating a loading torque exerted on the second actuator body on the basis of a mathematical model of the electrical actuator, the adder comprising a third electrical input for receiving an electrical output signal $U_{CLT}$ of the disturbance observer corresponding to a value of the loading torque calculated by the disturbance observer.

9. An electrical actuator as in claim 1 wherein the first control member comprises an electrical limiter for limiting the signal $u_{EM}$ corresponding to the required electromagnetic torque $T_{EM}$ if said signal $u_{EM}$ exceeds a predetermined limit value.

10. An electrical actuator as in claim 2 wherein the second control member comprises an electrical memory with a first electrical input for receiving the signal $u_{EM}$ corresponding to the required electromagnetic torque $T_{EM}$, a second electrical input for receiving the signal $u_{\phi\phi}$ corresponding to the measured angle of rotation $\phi_M$, and an electrical output for supplying the signal $u_I$ corresponding to the required current, the memory being provided with a tabular relation between the electromagnetic torque, the angle of rotation and the current.

11. An electrical actuator as in claim 1 wherein the second control member comprises a comparator having a first electrical input for receiving the signal $u_I$, a second electrical input for receiving an electrical signal $u_{II}$ which is supplied by an electrical current sensor and which corresponds to a measured current through the energizing means, and an electrical output for supplying a differential signal $u_{DI}$ which is proportional to a difference between the signal $u_I$ and the signal $u_{II}$, the second control member further comprising a regulator with an electrical input for receiving said differential signal $u_{DI}$ and an electrical output for supplying an electrical signal $u'_I$ corresponding to the electrical current supplied to the energizing means.

12. An electrical actuator as in claim 11 wherein the first control member further comprises an electrical adder with an electrical output which supplies the signal $u_{EM}$ corresponding to the required electromagnetic torque $T_{EM}$, and a disturbance observer for calculating a loading torque exerted on the second actuator body on the basis of a mathematical model of the electrical actuator, the adder comprising a first electrical input for receiving a feed-forward control signal $u_{FF}$ determined by the signal $u_\phi$ corresponding to the required angle of rotation $\phi_R$, a second electrical input for receiving a feedback control signal $u_{FB}$ determined by the signal $u_\phi$ corresponding to the required angle of rotation $\phi_R$ and by an electrical signal $u_{\phi\phi}$ which is supplied by an angle of rotation sensor and which corresponds to a measured angle of rotation $\phi_M$ of the second actuator body, and a third electrical input for receiving an electrical output sign $u_{CLT}$ of the disturbance observer corresponding to a value of the loading torque calculated by the disturbance observer, and wherein the disturbance observer has an electrical input for receiving the signal $u_{II}$ corresponding to the measured current through the energizing means, the disturbance observer calculating the angle of rotation, an angular velocity of the second actuator body, and the loading torque on the basis of three state equations for the electrical actuator.

13. An electrical actuator as in claim 12 wherein the disturbance observer comprises a further electrical input for receiving the signal $u_{\phi\phi}$ corresponding to the measured angle of rotation $\phi_M$, a comparator for determining a deviation between the measured angle of rotation and the calculated angle of rotation, and an adder for correcting the calculated angle of rotation, the calculated angular velocity, and the calculated loading torque by a value proportional to said deviation.

14. An electrical actuator as in claim 11 wherein the control unit comprises an electrical limiter for limiting the signal $u_{II}$ corresponding to the current if said signal exceeds a predetermined limit value.

15. Throttle device for use in an air inlet of an internal-combustion engine, which throttle device comprises a throttle valve housing, an air passage which is connectable to the air inlet, a throttle valve which is journalled in the throttle valve housing so as to be pivotable in the air passage, and an electrical actuator for pivoting the throttle valve, wherein the electrical actuator comprises a first actuator body, a second actuator body which is rotatable with respect to the first actuator body about an axis of rotation, means for exerting a load torque on the second actuator body, which load torque urges said second actuator body toward a rest position with respect to said first actuator body, electrical energizing means for exerting an electromagnetic torque on the second actuator body, said electromagnetic torque acting oppositely to said load torque to cause said second actuator body to rotate through an angle of rotation $\phi$ from said rest position to a desired position, said angle $\phi$ being proportional to said electromagnetic torque, a first control member having an electrical input for receiving an electrical signal $u_\phi$ corresponding to a required angle of rotation $\phi_R$ of the second actuator body, and an electrical output for supplying an electrical signal $u_{EM}$ corresponding to the electromagnetic torque $T_{EM}$ which is required to achieve the required angle $\phi_R$, and a second control member having an electrical input for receiving the signal $u_{EM}$, and an electrical output for supplying a signal $u_I$ which is used to determine an electrical current supplied to said energizing means to exert the required electromagnetic torque $T_{EM}$.

* * * * *